United States Patent
Wood, Jr.

[19]

[11] Patent Number: 6,023,610
[45] Date of Patent: *Feb. 8, 2000

[54] COMMUNICATION SYSTEM INCLUDING DIVERSITY ANTENNA QUEUING

[75] Inventor: Clifton W. Wood, Jr., Boise, Id.

[73] Assignee: Micron Technology, Inc., Boise, Id.

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 09/166,484

[22] Filed: Oct. 5, 1998

Related U.S. Application Data

[63] Continuation of application No. 08/772,173, Dec. 18, 1996, Pat. No. 5,842,118.

[51] Int. Cl.$^7$ .................................................. H04B 7/02
[52] U.S. Cl. ........................................................ 455/101
[58] Field of Search .............................. 455/41, 59, 62, 455/67.1, 73, 575, 101, 103, 106, 133, 272, 277.1, 277.2, 278.1; 340/825.47, 825.54; 342/42, 43, 50, 51; 375/267, 299

[56] References Cited

U.S. PATENT DOCUMENTS

| | | | |
|---|---|---|---|
| 4,075,632 | 2/1978 | Baldwin et al. | 343/6.8 |
| 4,584,709 | 4/1986 | Kneisel et al. | 455/78 |
| 4,742,567 | 5/1988 | Ohe et al. | 455/277 |
| 4,926,182 | 5/1990 | Ohta et al. | 342/44 |
| 5,097,484 | 3/1992 | Akaiwa | 375/40 |
| 5,203,018 | 4/1993 | Hirose | 455/101 |
| 5,203,024 | 4/1993 | Yamao | 455/133 |
| 5,432,027 | 7/1995 | Tuttle et al. . | |
| 5,491,723 | 2/1996 | Diepstraten | 455/101 |
| 5,494,495 | 2/1996 | Tuttle . | |
| 5,497,140 | 3/1996 | Tuttle . | |
| 5,499,397 | 3/1996 | Wadin et al. | 455/277.1 |
| 5,507,035 | 4/1996 | Bantz et al. | 455/101 |
| 5,539,775 | 7/1996 | Tuttle et al. . | |
| 5,568,512 | 10/1996 | Rotzoll . | |
| 5,583,850 | 12/1996 | Snodgrass et al. | 370/342 |
| 5,621,412 | 4/1997 | Sharpe et al. | 342/51 |
| 5,649,296 | 7/1997 | MacLellan et al. | 455/38.2 |
| 5,662,718 | 9/1997 | Tuttle . | |
| 5,842,118 | 11/1998 | Wood, Jr. | 455/101 |

FOREIGN PATENT DOCUMENTS

| | | |
|---|---|---|
| 0 474 491 | 9/1991 | European Pat. Off. . |
| 0 670 558 | 2/1995 | European Pat. Off. . |
| 0 740 262 | 4/1996 | European Pat. Off. . |
| WO 95/30290 | 11/1995 | WIPO . |
| WO 98/27670 | 6/1998 | WIPO . |

*Primary Examiner*—Thanh Cong Le
*Attorney, Agent, or Firm*—Wells, St. John, Roberts, Gregory & Matkin, P.S.

[57] ABSTRACT

A wireless communications system comprising a first transponder having a plurality of selectable antennas, and having a stack including locations holding data representing antennas, the stack defining an order in which antennas will be used to attempt communication; a second transponder configured to communicate with the first transponder, wherein the first transponder uses an antenna defined by data in one location of the stack for communication with the second transponder, and, if successful communication with the second transponder is not established, the transponder uses an antenna defined by data in another if location of the stack.

43 Claims, 6 Drawing Sheets

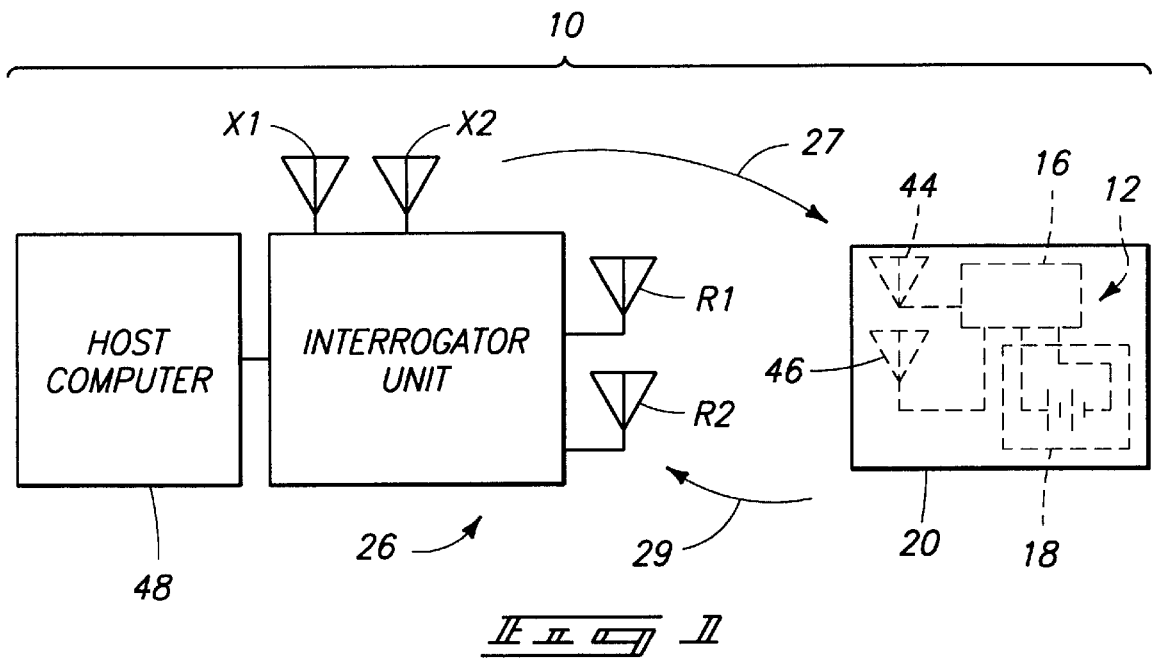
_FIG. 1_
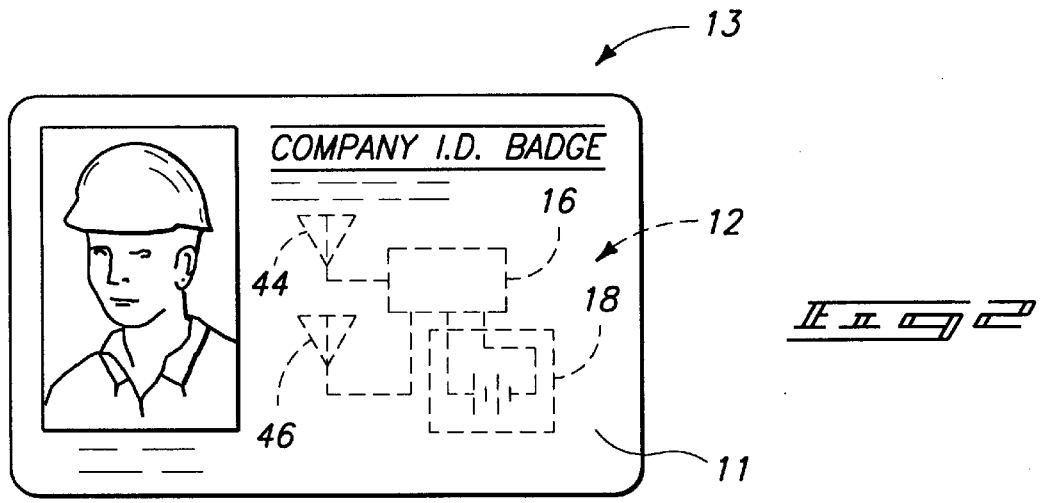
_FIG. 2_
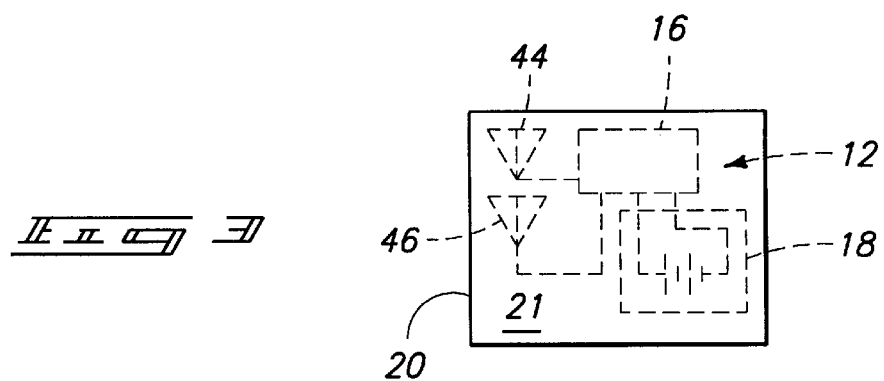
_FIG. 3_

Fig. 8

| | | |
|---|---|---|
| ATTEMPT 1 | X1 | R1 |
| ATTEMPT 2 | X1 | R2 |
| ATTEMPT 3 | X2 | R1 |
| ATTEMPT 4 | X2 | R2 |

| | |
|---|---|
| X2 | R1 |
| X1 | R1 |
| X1 | R2 |
| X2 | R2 |

| | |
|---|---|
| X1 | R1 |
| X2 | R1 |
| X1 | R2 |
| X2 | R2 |

90

COMMUNICATION SYSTEM INCLUDING DIVERSITY ANTENNA QUEUING

CROSS REFERENCE TO RELATED APPLICATION

This is a Continuation of U.S. patent application Ser. No. 08/772,173, filed Dec. 18, 1996, U.S. Pat. No. 5,842,118.

TECHNICAL FIELD

This invention relates to radio frequency communication devices.

BACKGROUND OF THE INVENTION

Radio frequency (wireless) communications systems are known in the art. Radio frequency communications systems typically include a transmitter and a receiver, such as for radio or television broadcasting. Other communications systems are bidirectional and include a first transponder that can send or receive a radio frequency communication, and a second transponder that can receive the radio frequency communications from the first transponder and transmit, via radio frequency, back to the first transponder. For example, cellular telephone communications are bidirectional.

Some communication systems include antenna diversity systems. For example, U.S. Pat. No. 5,203,024 to Yamao (incorporated herein by reference) discloses an antenna selection diversity receiver system for TDM signals that switches antennas for every assigned time slot so the best receive signal quality is obtained, according to a prediction made by using signal quality just before the assigned time slot.

U.S. Pat. No. 5,499,397 to Wadin et al. (incorporated by reference) discloses selecting one of at least two antennas in a communication unit. A signal is received by a radio frequency receiver during a receiving period from one of the antennas. the signal is transmitted in a digital communications format. The quality of the receive signal is determined by a switch diversity algorithm that bases the decision to switch antennas on predetermined thresholds established for each of: a received signal strength indicator, a phase error signal, and a recovered clock signal.

U.S. Pat. No. 4,584,709 to Kneisel et al. (incorporated by reference) discloses an antenna system that evaluates the quality of a received signal, and if the signal is below a predetermined threshold level, an alternate antenna will be selected. The antenna system will continue to sample the available antennas until an antenna produces a signal of acceptable quality.

U.S. Pat. No. 4,742,567 to Ohe, et al. (incorporated by reference) discloses an automobile antenna system including two antennas attached to the rear windshield of a vehicle body. A high-frequency pickup is provided on the front pillar of the vehicle body for detecting the lowering of the output level of a main antenna in advance, and an antenna selecting signal generator actuates a switch circuit so that the main antenna, the output level of which is predicted to dip after a predetermined lapse of time, is changed over to the sub antenna.

U.S. Pat. No. 5,097,484 to Akaiwa discloses transmission and reception equipment which is in digital communication with transmission and reception equipment having a single antenna. An antenna for transmission is selected from a plurality of antennae at the time of transmission in accordance with information of a memory unit.

Radio frequency identification devices define another form of bidirectional communications systems. As large numbers of objects are moved in inventory, product manufacturing, and merchandising operations, there is a continuous challenge to accurately monitor the location and flow of objects. Additionally, there is a continuing goal to interrogate the location of objects in an inexpensive and streamlined manner. Furthermore, there is a need for tag devices suitably configured to mount to a variety of objects including goods, items, persons, or animals, or substantially any moving or stationary and animate or inanimate object. One way of tracking objects is with an electronic identification system.

One presently available electronic identification system utilizes a magnetic field modulation system to monitor tag devices. An interrogator creates a magnetic field that becomes detuned when the tag device is passed through the magnetic field. In some cases, the tag device may be provided with a unique identification code in order to distinguish between a number of different tags. Typically, the tag devices are entirely passive (have no power supply), which results in a small and portable package. However, this identification system is only capable of distinguishing a limited number of tag devices, over a relatively short range, limited by the size of a magnetic field used to supply power to the tags and to communicate with the tags.

Another electronic identification system utilizes an RF transponder device affixed to an object to be monitored, in which an interrogator transmits an interrogation signal to the device. The device receives the signal, then generates and transmits a responsive signal. The interrogation signal and the responsive signal are typically radio-frequency (RF) signals produced by an RF transmitter circuit. Since RF signals can be transmitted over greater distances than magnetic fields, RF-based transponder devices tend to be more suitable for applications requiring tracking of a tagged device that may not be in close proximity to an interrogator. For example, RF-based transponder devices tend to be more suitable for inventory control or tracking.

BRIEF DESCRIPTION OF THE DRAWINGS

Preferred embodiments of the invention are described below with reference to the following accompanying drawings.

FIG. 1 is a block diagram illustrating a communication system embodying the invention.

FIG. 2 is a front view of an employee badge according to one embodiment the invention.

FIG. 3 is a front view of a radio frequency identification tag according to another embodiment of the invention.

FIG. 8 illustrates a stack or queue containing data representing an order of antennas to use in attempts to communicate from the interrogator to the transponder of FIG. 2 or 3.

FIG. 9 illustrates the stack after being rearranged in accordance with one embodiment of the invention.

FIG. 10 illustrates the stack after being rearrange in accordance with another embodiment of the invention.

SUMMARY OF THE INVENTION

Figure 4:
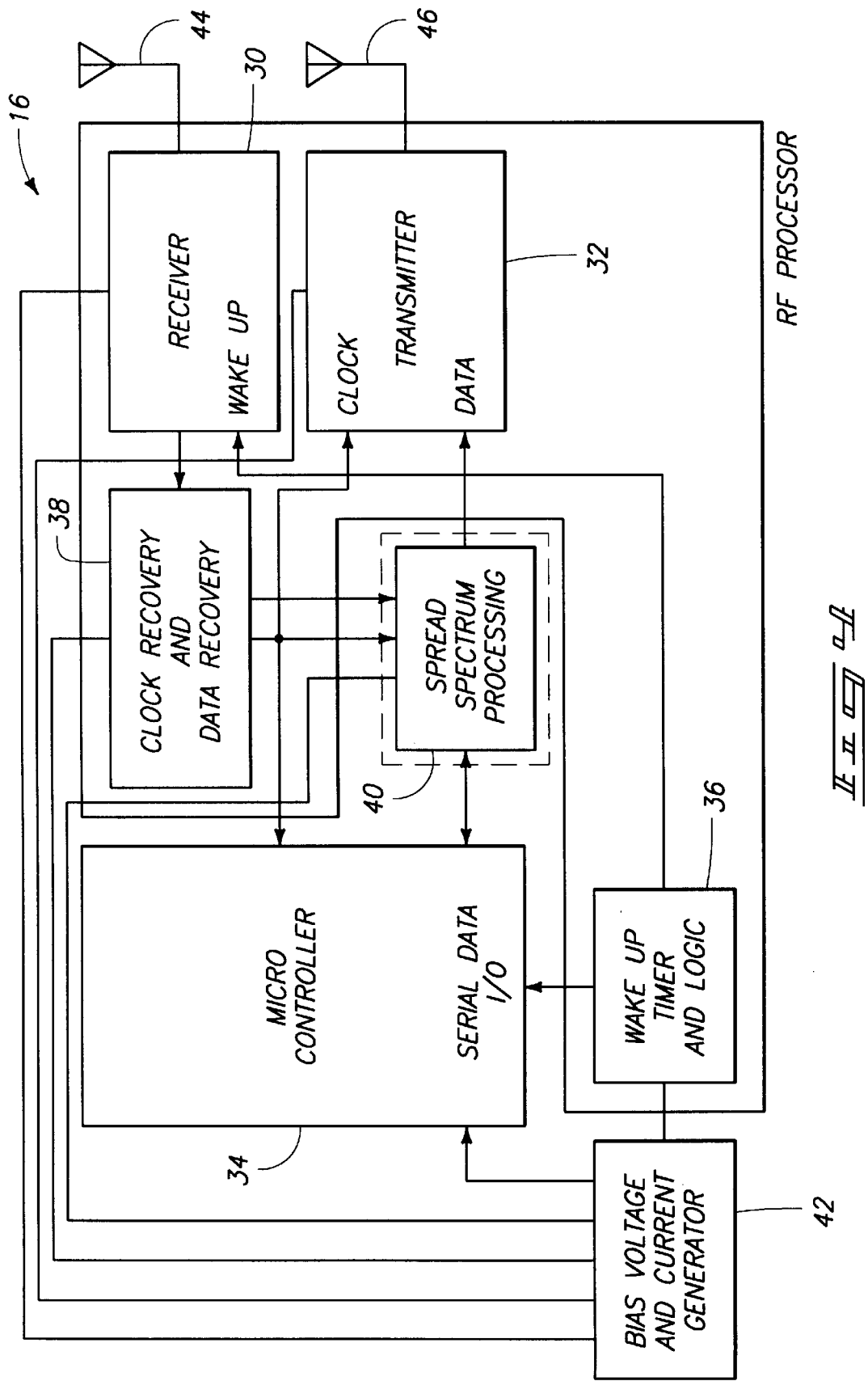
FIG. 4 is a circuit schematic of a transponder included in the system of FIG. 1.

The invention provides a wireless communications system comprising a first transponder adapted to be coupled to one of a plurality of selectable antennas, and having a queue or stack including locations holding data representing antennas. The queue or stack defines an order in which antennas will be used to attempt communication. The communications system further includes a second transponder configured to communicate with the first transponder. The first transponder uses an antenna defined by data in one location of the queue or stack for communication with the second transponder. If successful communication with the second transponder is not established, the transponder uses an antenna defined by data in another location of the queue or stack.

In one aspect of the invention, the first transponder rearranges the stack if successful communication is not established using the antenna defined by data in the first mentioned location of the stack.

In one aspect of the invention, the first transponder communicates with the second transponder using backscatter communication. More particularly, in this embodiment, the first transponder employs separate so receive and transmit antennas, and wherein the respective locations of the stack store data representing antenna pairs including one transmit antenna and one receive antenna.

One aspect of the invention provides a wireless communications system wherein the second transponder comprises an integrated circuit including a transmitter, a receiver, and a microprocessor. In one aspect of the invention, the second transponder comprises a radio frequency identification device including memory storing data identifying the second transponder.

One aspect of the invention provides a wireless communications system wherein the first transponder rearranges the stack if successful communication is not established using the antenna defined by data in the first mentioned location of the stack such that data representing an antenna using which successful communications is established is moved to the first mentioned location of the stack.

One aspect of the invention provides a wireless communications system wherein the first transponder rearranges the stack if successful communication is not established using the antenna defined by data in the first mentioned location of the stack such that data representing an antenna using which successful communications is established is moved closer to the first mentioned location of the stack.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

FIG. 1 illustrates a wireless communications system 10 embodying the invention. The communications system 10 includes a first transponder including an interrogator unit (interrogator) 26 and a host computer 48 in communication with the interrogator 26. The communications system 10 further includes a radio frequency data communication device 12 such as the device disclosed in U.S. patent application Ser. No. 08/705,043, filed Aug. 29, 1996. While other embodiments are possible, in the illustrated embodiment, the radio frequency data communications device 12 includes a transponder 16 having a receiver 30 and a transmitter 32. The data communications device 12 further includes a power source 18 connected to the transponder 16 to supply power to the transponder 16. The data communications device 12 further includes at least one antenna connected to the transponder 16 for wireless transmission and reception. In the illustrated embodiment, the data communications device 12 includes at least one antenna 46 connected to the transponder 16 for radio frequency transmission by the transponder 16, and at least one s receive antenna 44 connected to the transponder 16 for radio frequency reception by the transponder 16. In one embodiment, the device 12 includes a single antenna for transmitting and receiving. In the illustrated embodiment, the transponder 16 is in the form of an integrated circuit. However, in alternative embodiments, some or all of the circuitry of the transponder 16 is not necessarily all included in a if single integrated circuit. The power source 18 is a thin film battery in the illustrated embodiment; however, in alternative embodiments, other forms of power sources can be employed.

The radio frequency data communication device 12 can be included in any appropriate housing or packaging.

FIG. 2 shows but one example of a housing in the form of a card comprising plastic or other suitable material. The plastic card 11 houses the radio frequency data communication device 12 to define an employee identification badge 13 including the radio frequency data communication device 12. In one embodiment, the front face of the badge 13 has visual identification features including an employee photograph as well as identifying text.

FIG. 3 illustrates but one alternative housing supporting the device 12. More particularly, FIG. 3 illustrates a miniature housing 20 encasing the device 12 to define a tag which can be supported by an object (e.g., hung from an object, affixed to an object, etc.). The housing 20 preferably has the general shape and size, in plan view, of a postage stamp. The embodiment of FIG. 3 also includes a card 21 supporting the device 12 in the housing 20. The card 21 is formed of plastic or other suitable material having a thickness of about 0.040 inches, a width of about 1.25 inches, and a height of about 1.25 inches. In one embodiment, the device 12 is bonded to a back face of the card 21 with a thin layer of non-conductive epoxy material that cooperates with the card to define the housing 20.

Although two particular types of housings have been disclosed, the device 12 can be included in any appropriate housing. The device 12 is of a small size that lends itself to applications employing small housings, such as cards, miniature tags, etc. Larger housings can also be employed. The device 12, housed in any appropriate housing, can be supported from or attached to an object in any desired manner; for example using double sided tape, glue, lanyards, leash, nails, staples, rivets, or any other fastener. The housing can be sewn on to an object, hung from an object, implanted in an object (hidden), etc.

Various configurations are possible for the antenna connected to the transponder 16. In one embodiment, separate antennas 44 and 46 are provided for receiver and transmitter. In another embodiment (FIG. 1), a single antenna is shared by the receiver and transmitter. In one embodiment, one or more antennas are defined by conductive epoxy screened onto a card or housing. In the illustrated embodiment, the antenna is conductively bonded to the integrated circuit via bonding pads.

If the power source 18 is a battery, the battery can take any suitable form. Preferably, the battery type will be selected depending on weight, size, and life requirements for a particular application. In one embodiment, the battery 18 is a thin profile button-type cell forming a small, thin energy cell more commonly utilized in watches and small electronic devices requiring a thin profile. A conventional button-type cell has a pair of electrodes, an anode formed by one face and a cathode formed by an opposite face. Exemplary button-type cells are disclosed in several pending U.S. patent applications including U.S. patent application Ser. No. 08/205,957, "Button-Type Battery Having Bendable Construction and Angled Button-Type Battery," listing Mark E. Tuttle and Peter M. Blonsky as inventors; now U.S. Pat. No. 5,432,027; U.S. patent application Ser. No. 08/321,251, "Button-Type Batteries and Method of Forming Button-Type Batteries," listing Mark E. Tuttle as inventor, now U.S. Pat. No. 5,494,495; and U.S. patent application Ser. No. 08/348,543, "Method of Forming Button-Type Batteries and a Button-Type Battery Insulating and Sealing Gasket," listing Mark E. Tuttle as inventor, now abandoned. These patent applications and resulting patents are hereby incorporated by reference. In an alternative embodiment, the battery 18 comprises a series connected pair of button type cells. Instead of using a battery, any suitable power source can be employed.

The device 12 transmits and receives radio frequency communications to and from the interrogator 26. The interrogator unit 26 includes a plurality of antennas, as well as transmitting and receiving circuitry, similar to that implemented in the device 16. The host computer 48 acts as a master in a master-slave relationship with the interrogator 26. The host computer 48 includes an applications program for controlling the interrogator 26 and interpreting responses, and a library of radio frequency identification device applications or functions. Most of the functions communicate with the interrogator 26. These functions effect radio frequency communication between the interrogator 26 and the device 12. These functions are described below in a section titled "Protocol." In one embodiment, the host computer 48 and the interrogator 26 are combined together (e.g., in a common housing), or functions of the host computer are implemented in hard wired digital logic circuitry.

In the illustrated embodiment, the communications system 10 includes multiple selectable transmit antennas X1, X2, etc., and multiple receive antennas R1, R2, etc. connected to the interrogator 26. In one embodiment, the communications system 10 includes multiple selectable antennas that are respectively used both for transmitting and receiving by the interrogator 26. Generally, the interrogator 26 transmits an interrogation signal or command 27 ("forward link") via one of the antennas X1, X2, etc. The device 12 receives the incoming interrogation signal via its antenna 44. Upon receiving the signal 27, the device 12 responds by generating and transmitting a responsive signal or reply 29 ("return link"). The interrogator 26 is described in greater detail below.

In one embodiment, the responsive signal 29 is encoded with information that uniquely identifies, or labels the particular device 12 that is transmitting, so as to identify any object or person with which the device 12 is associated. Other embodiments are possible for the device 12, such as cellular telephone embodiments, or embodiments that include global positioning circuitry (e.g., such as the transponder devices sold by Micron Communications, Inc. under the trademark "AMBIT."

In the embodiment illustrated in FIG. 1, multiple devices 12 can be employed; however, there is no communication between multiple devices 12. Instead, the multiple devices 12 communicate with the interrogator 26. FIG. 1 illustrates the device 12 as being in the housing 20 of FIG. 3. The system would operate in a similar manner if the device 12 is provided in a housing such as the housing 10 of FIG. 2, or any other appropriate housing. Multiple devices 12 can be used in the same field of an interrogator 26 (i.e., within communications range of an interrogator 26). Similarly, multiple interrogators 26 can be in proximity to one or more of the devices 12.

Various U.S. patent applications, which are incorporated herein by reference, disclose features that are employed in various alternative embodiments of the invention: Ser. No. 08/092,147, filed Jul. 15, 1993, "Wake Up Device for a Communications System", now abandoned; and continuation application Ser. No. 08/424,827, filed Apr. 19, 1995, "Wake Up Device for a Communications System", now U.S. Pat. No. 5,790,946; Ser. No. 08/281,384, filed Jul. 27, 1994, "Communication System Having Transmitter Frequency Control", now U.S. Pat. No. 5,568,512; Ser. No. 07/990,918, filed Dec. 15, 1992, now U.S. Pat. No. 5,365,551, "Data Communication Transceiver Using Identification Protocol"; Ser. No. 07/899,777, filed Jun. 17, 1992, "Radio Frequency Identification Device (RFID) and Method of Manufacture, Including an Electrical Operating System and Method," now abandoned; Ser. No. 07/921,037, filed Jul. 24, 1992, "Anti-Theft Method for Detecting The Unauthorized Opening of Containers and Baggage," now abandoned; Ser. No. 07/928, 899, filed Aug. 12, 1992, "Electrically Powered Postage Stamp or Mailing or Shipping Label Operative with Radio Frequency (RF) Communications," now abandoned; and Ser. No. 08/032,384, filed on Mar. 17, 1993, "Modulated Spread Spectrum in RF Identification Systems Method," now abandoned.

The above described system 10 is advantageous over prior art devices that utilize magnetic field effect systems because, with the system 10, a greater range can be achieved, and more information can be obtained (instead of just an identification number). As a result, such a system 10 can be used, for many applications. The system 10 is useful whenever RF transmission over a large range is desirable, such as for inventory control. In one embodiment, the sensitivity of the devices 12 is adjustable so that only devices within a certain range of the interrogator 26 will respond. In another embodiment, the power of the interrogator 26 is adjustable so that only devices within a certain range of the interrogator 26 will respond.

However, a power conservation problem is posed by such implementations where batteries are used to supply power to the integrated circuits 16. If the integrated circuit 16 operates continuously at full power, battery life will be short, and device 12 will have to be frequently replaced. If the battery 18 is permanently sealed in a housing, replacement of the battery will be difficult or impossible. For example, one reason for sealing the battery with the integrated circuit and antenna 14 in a housing is to simplify the design and construction, to reduce the cost of production, and protect the electrical interconnections between devices. Another reason is protection of the battery and integrated circuit 16 from moisture and contaminants. A third reason is to enhance the cosmetic appeal of the device 12 by eliminating the need for an access port or door otherwise necessary to insert and remove the battery. When the battery is discharged, the entire badge or stamp is then discarded. It is therefore desirable in this and other applications to incorporate power conservation techniques into the integrated circuit 16 in order to extend useful life.

FIG. 4 is a high level circuit schematic of the transponder 16 utilized in the devices of FIGS. 1–3. In the embodiment shown in FIG. 4, the transponder 16 is a monolithic integrated circuit. More particularly, in the illustrated embodiment, the integrated circuit 16 comprises a single die, having a size of 209×116 mils$^2$, including the receiver 30, the transmitter 32, a micro controller or microprocessor 34, a wake up timer and logic circuit 36, a clock recovery and data recovery circuit 38, and a bias voltage and current generator 42.

In one embodiment, the devices 12 switch between a "sleep" mode of operation, and higher power modes to conserve energy and extend battery life during periods of time where no interrogation signal 27 is received by the device 12, using wake up timer and logic circuitry 36.

In one embodiment, a spread spectrum processing circuit 40 is also included in the transponder 16. In this embodiment, signals transmitted and received by the interrogator 26, and transmitted and received by the device 12 are modulated spread spectrum signals. Spread spectrum modulation is described below. In the illustrated embodiment, the modulation scheme for replies sent by the transmitter 32 is selectable. One of the available selections for replies sent by the transmitter 32 is modulated spread spectrum.

Spread Spectrum Modulation

Many modulation techniques minimize required transmission bandwidth. However, the spread spectrum modulation technique employed in the illustrated embodiment requires a transmission bandwidth that is up to several orders of magnitude greater than the minimum required signal bandwidth. Although spread spectrum modulation techniques are bandwidth inefficient in single user applications, they are advantageous where there are multiple users, as is the case with the instant radio frequency identification system 24. The spread spectrum modulation technique of the illustrated embodiment is advantageous because the interrogator signal can be distinguished from other signals (e.g., radar, microwave ovens, etc.) operating at the same frequency. The spread spectrum signals transmitted by the device 12 and by the interrogator 26 are pseudo random and have noise-like properties when compared with the digital command or reply. The spreading waveform is controlled by a pseudo-noise or pseudo random number (PN) sequence or code. The PN code is a binary sequence that appears random but can be reproduced in a predetermined manner by the device 12. More particularly, incoming spread spectrum signals are demodulated by the device 12 or by the interrogator 26 through cross correlation with a version of the pseudo random carrier that is generated by the device 12 itself or the interrogator 26 itself, respectfully. Cross correlation with the correct PN sequence unspreads the spread spectrum signal and restores the modulated message in the same narrow band as the original data.

A pseudo-noise or pseudo random sequence (PN sequence) is a binary sequence with an autocorrelation that resembles, over a period, the autocorrelation of a random binary sequence. The autocorrelation of a pseudo-noise sequence also roughly resembles the autocorrelation of band-limited white noise. A pseudo-noise sequence has many characteristics that are similar to those of random binary sequences. For example, a pseudo-noise sequence has a nearly equal number of zeros and ones, very low correlation between shifted versions of the sequence, and very low cross correlation between any two sequences. A pseudo-noise sequence is usually generated using sequential logic circuits. For example, a pseudo-noise sequence can be generated using a feedback shift register.

A feedback shift register comprises consecutive stages of two state memory devices, and feedback logic. Binary sequences are shifted through the shift registers in response to clock pulses, and the output of the various stages are logically combined and fed back as the input to the first stage. The initial contents of the memory stages and the feedback logic circuit determine the successive contents of the memory.

The illustrated embodiment employs direct sequence spread spectrum modulation. A direct sequence spread spectrum (DSSS) system spreads the baseband data by directly multiplying the baseband data pulses with a pseudo-noise sequence that is produced by a pseudo-noise generator. A single pulse or symbol of the PN waveform is called a "chip." Synchronized data symbols, which may be information bits or binary channel code symbols, are added in modulo-2 fashion to the chips before being modulated. The receiver performs demodulation. For example, in one embodiment the data is phase modulated, and the receiver performs coherent or differentially coherent phase-shift keying (PSK) demodulation. In another embodiment, the data is amplitude modulated. Assuming that code synchronization has been achieved at the receiver, the received signal passes through a wideband filter and is multiplied by a local replica of the PN code sequence. This multiplication yields the unspread signal.

A pseudo-noise sequence is usually an odd number of chips long. In the illustrated embodiment, one bit of data is represented by a thirty-one chip sequence. A zero bit of data is represented by inverting the pseudo-noise sequence.

Spread spectrum techniques are also disclosed in the following patent applications and patent, which are incorporated herein by reference: U.S. patent application Ser. No. 08/092,147, now abandoned; U.S. patent application Ser. No. 08/424,827, filed Apr. 19, 1995, now U.S. Pat. No. 5,790,946; and U.S. Pat. No. 5,121,407 to Partyka et al. They are also disclosed, for example, in "Spread Spectrum Systems," by R. C. Dixon, published by John Wiley and Sons, Inc.

Backscatter and Frequency Hopping

The interrogator sends out a command that is spread around a certain center frequency (e.g, 2.44 GHz). After the interrogator transmits the command, and is expecting a response, the interrogator switches to a CW mode (continuous wave mode). In the continuous wave mode, the interrogator does not transmit any information. Instead, the interrogator just transmits 2.44 GHz radiation. In other words, the signal transmitted by the interrogator is not modulated. After the device 12 receives the command from the interrogator, the device 12 processes the command. If the device 12 is in a backscatter mode it alternately reflects or does not reflect the signal from the interrogator to send its reply. For example, in the illustrated embodiment, two halves of a dipole antenna are either shorted together or isolated from each other to send a reply.

Frequency hopping is employed in one embodiment. In the illustrated embodiment, frequency hopping does not occur when the interrogator transmits a command, but occurs when the interrogator is in the continuous wave mode. The interrogator, in the continuous wave mode, hops between various frequencies close to the 2.44 GHz frequency. These various frequencies are sufficiently close to the 2.44 GHz frequency that backscatter antenna reflection characteristics of the device 12 are not appreciably altered. Because the interrogator is hopping between frequencies, the interrogator knows what frequency backscatter reflections to expect back from the device 12. By hopping between various frequencies, the amount of time the interrogator continuously uses a single frequency is reduced. This is advantageous in view of FCC regulatory requirements.

In the illustrated embodiment, no attempt is made to frequency hop at the interrogator to a pseudo-random sequence and then correlate to that at the receiver. However, in alternative embodiments, such correlation takes place.

In one embodiment, the transmitter 32 is switchable between operating in a modulated backscatter transmitter mode, and operating in an active mode. The transmitter 32 switches between the backscatter mode and the active mode in response to a radio frequency command, instructing the transmitter to switch, sent by the interrogator 26 and received by the receiver 30. In the active mode, a carrier for the transmitter is extracted from a signal received by the receiver 30.

Active transmitters are known in the art. See, for example, U.S. patent application Ser. No. 08/281,384, now U.S. Pat. No. 5,568,512; U.S. patent application Ser. No. 08/281,384 also discloses how transmit frequency for the transmitter 32 is recovered from a message received via radio frequency from the interrogator 26.

In one embodiment, the transmitter 32 is capable of transmitting using different modulation schemes, and the modulation scheme is selectable by the interrogator. More particularly, if it is desired to chance the modulation scheme, the interrogator sends an appropriate command via radio frequency. In this embodiment, the transmitter can switch between multiple available modulation schemes such as Binary Phase Shift Keying (BPSK), Direct Sequence Spread Spectrum, On-Off Keying (OOK), and Modulated Backscatter (MBS).

In one embodiment, the clock for the entire integrated circuit 16 is extracted from the incoming message itself by clock recovery and data recovery circuitry 38. This clock is recovered from the incoming message, and used for timing for the micro controller 34 and all the other clock circuitry on the chip, and also for deriving the transmitter carrier or the subcarrier, depending on whether the transmitter is operating in active mode or backscatter mode.

In addition to recovering a clock, the clock recovery and data recovery circuit 38 also performs data recovery on valid incoming signals. The valid spread spectrum incoming signal is passed through the spread spectrum processing circuit 40, and the spread spectrum processing circuit 40 extracts the actual ones and zeros of data from the incoming signal. More particularly, the spread spectrum processing circuit 40 takes the chips from the spread spectrum signal, and reduces each thirty-one chip section down to a bit of one or zero, which is passed to the micro controller 34.

The micro controller 34 includes a serial processor, or I/O facility that received the bits from the spread spectrum processing circuit 40. The micro controller 34 performs further error correction. More particularly, a modified hamming code is employed, where each eight bits of data is accompanied by five check bits used by the micro controller 34 for error correction. The micro controller 34 further includes a memory, and after performing the data correction, the micro controller 34 stores bytes of the data bits in memory. These bytes contain a command sent by the interrogator 26. The micro controller 34 responds to the command.

For example, the interrogator 26 may send a command requesting that any device 12 in the field respond with the device's identification number. Status information is also returned to the interrogator 26 from the device 12 when the device 12 responds.

The transmitted replies have a format similar to the format of incoming messages. More particularly, a reply starts with a preamble (e.g., all zeros in active mode, or alternating double zeros and double ones in backscatter mode), followed by a Barker or start code which is thirteen bits long, followed by actual data.

No stop bits are included in the incoming message or reply, in the preferred embodiment. Instead, part of the incoming message describes how many bytes are included, so the integrated circuit 16 knows how much information is included. Similarly, part of the outgoing reply describes how many bytes are included, so the interrogator 12 knows how much information is included. The incoming message and outgoing reply preferably also include a check sum or redundancy code so that the integrated circuit 16 or the interrogator 12 can confirm receipt of the entire message or reply.

After the reply is sent, the integrated circuit 16 returns to the sleep mode, and the wake up timer and logic circuit 36 starts timing again for the next wake up (e.g., in 16 milliseconds, or whatever period is selected).

The interrogator 26 provides a communication link between a host computer and the transponder 16. The interrogator 26 connects to the host computer 48 via an IEEE-1284 enhanced parallel port (EPP). The interrogator communicates with the transponder 16 via the RF antennas X1, X2, . . . , R1, R2 . . . , etc.

In one embodiment, communications from the interrogator 26 to the transponder 16, and communications from the transponder 16 to the interrogator 26 use different physical protocols.

The physical communications protocol for communications from the interrogator 26 to the transponder 16 is referred to as the "forward link" protocol. The forward link data is sent in the following order:

Preamble

Barker Code

Command Packet

Check Sum

A Maximal Length Pseudo Noise (PN) Sequence is used in the Direct Sequence Spread Spectrum (DSSS) communications scheme in the forward link. In one embodiment, the sequence is generated by a linear feedback shift register of the form [5,2]. That is, there are five registers, the output of the second register is X-ORed with the output of the fifth register, and the result is fed into the input of the first register one. This produces a repeating 31 "chip" sequence. The sequence ends with all registers set to one. The sequence is taken from the output of the first register. This code is synchronous with the data in that each data bit comprises one and only one full PN sequence. The chip sequence for each bit is:

001 1010 0100 0010 1011 1011 0001 1111.

Other embodiments are, of course, possible. For example, other forms of linear feedback shift registers can be employed.

A zero bit is transmitted as one inverted full cycle of the PN sequence. A one bit is transmitted as one full non-inverted cycle of the PN sequence.

In the illustrated embodiment, the data is not differentially encoded.

In one embodiment, there are at least two available "chipping" rates. One rate is 9.5375 Mchips/sec (high band) and another rate is 4.768750 Mchips/sec (low band).

The preamble precedes the data. In one embodiment, the preamble includes a series of zeros, followed by a start or Barker code. In embodiments where the transponder 16 includes wake up timer and logic circuitry 36, the preamble includes a series of zeros for a duration equal to the wakeup interval (e.g., 0.5, 16, 64, or 256 ms) plus 2 milliseconds, followed by a start or Barker code.

In one embodiment, the Barker code is defined by the following bit string: 1111 1001 1010 1. Other embodiments are possible.

Command data is grouped into 13-bit words. Each word includes eight data bits (D7, D6, D5, D4, D3, D2, D1, D0) and five ECC (Error Correction Code) bits (P4, P3, P2, P1, and P0). In one embodiment, the bit transmission order is (with D7 transmitted first): D7, D6, D5, D4, D3, D2, D1, D0, P4, P3, P2, P1, P0 . . . .

In one embodiment, the ECC bits (P4–P0) are generated using the following equations:

$$P0=(D1+D2+D5+D7) \text{ modulo } 2$$

$$P1=[(D1+D3+D4+D6) \text{ modulo } 2] \text{ Complement}$$

$$P2=(D0+D2+D3+D6+D7) \text{ modulo } 2$$

$$P3=[(D0+D4+D5+D6+D7) \text{ modulo } 2] \text{ Complement}$$

$$P4=(D0+D1+D2+D3+D4+D5) \text{ modulo } 2.$$

Data rates depend on which data band is being used. The high data band has an effective data rate (adjusting for PN and ECC) of 189.3 Kbps. The low data band has an effective data rate of 94.68 Kbps.

In the illustrated embodiment, a 16-bit check sum is provided to detect bit errors on the packet level. A transponder 16 can be programmed to either return a reply if a bad check sum is found in the forward link, or to simply halt execution and send no replies. In one embodiment, a 16 bit CRC is employed in the forward link, the return link, or both, instead of or in addition to the check sum.

The physical communications protocol for communications from the transponder 16 to the interrogator 26 is referred to as the "return link" protocol. In the illustrated embodiment, the return link messages are sent in the following order:
Preamble,
Barker Code,
Reply Packet
Check Sum After sending a command, the interrogator sends a continuous unmodulated RF signal with a frequency of 2.44175; Ghz. Return link data is Differential Phase Shift Key (DPSK) modulated onto a square wave subcarrier with a frequency of 596.1 Khz. A data 0 corresponds to one phase and data 1 corresponds to another, shifted 180 degrees from the first phase. The subcarrier is used to modulate antenna impedance of a transponder 16. For a simple dipole, a switch between the two halves of the dipole antenna is opened and closed. When the switch is closed, the antenna becomes the electrical equivalent of a single half-wavelength antenna that reflects a portion of the power being transmitted by the interrogator. When the switch is open, the antenna becomes the electrical equivalenr of two quarter-wavelength antennas that reflect very little of the power transmitted by the interrogator. The switch driving a printed half wavelength dipole antenna gives a typical range of 15 feet when the interrogator 26 transmits at 30 dBm into a 6 dB gain antenna.

The preamble for the return link includes 2000 bits, alternating 2 zeros then 2 ones, etc., and a 13-bit start (Barker) code. Alternative preambles are possible.

In the illustrated embodiment, the start code or Barker Code is defined by the following bit string: 1111 1001 1010 1.

The reply link data is grouped in 13 bit words. Each word is composed of 8 data bits (D7, D6, D5, D4, D3, D2, D1, D0) and 5 ECC bits (P4, P3, P2, P1, P0).

The Block Encoded Sequence is D7, D6, D5, D4, D3, D2, D1, D0, P4, P3, P2, P1, P0.

The Block ECC Bits (P4–P0) are generated using the following equations:

$$P0=(D1+D2+D5+D7) \text{ modulo } 2$$

$$P1=[(D1+D3+D4+D6) \text{ modulo } 2] \text{ Complement}$$

$$P2=(D0+D2+D3+D6+D7) \text{ modulo } 2$$

$$P3=[(D3+D4+D5+D6+D7) \text{ modulo } 2] \text{ Complement}$$

$$P4=(D0+D1+D2+D3+D4+D5) \text{ modulo } 2.$$

In the illustrated embodiment, the bit duration is 6.71 $\mu s$ making the effective data rate 91.75 Kbps for the return link.

In the illustrated embodiment, a 16-bit check sum is provided to detect bit errors on the packet level. In one embodiment, a 16 bit CRC is employed in addition to or instead of the check sum.

Each pair of data words is interleaved, starting with the Barker code and the first data word. The transmitted bit order for two sequential words, A and B, is D7A, D7B, D6A, D6B, D5A, D5B, D4A, D4B, D3A, D3B, D2A, D2B, D1A, D1B, D0A, D0B, P4A, P4B, P3A, P3B, P2A, P2B, P1A, P1B, P0A, P0B.

D7A is the first transmitted bit. In the illustrated embodiment, DPSK is applied to the interleaved data.

Figure 5:
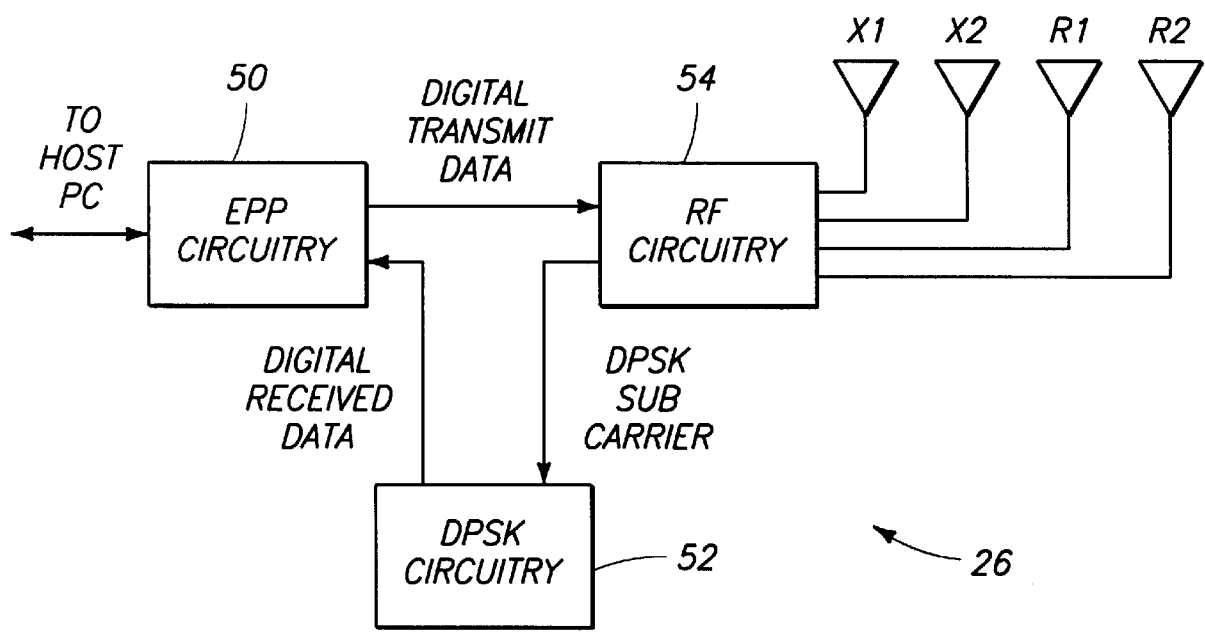
FIG. 5 is a block diagram of an interrogator in accordance with one embodiment of the invention.

In one embodiment (see FIG. 5), the interrogator 26 includes enhanced parallel port (EPP) circuitry 50, DPSK (differential phase shift keyed) circuitry 52, and RF (radio frequency) circuitry 54, as well as a power supply (not shown) and a housing or chassis (not shown). In the illustrated embodiment, the enhanced parallel port circuitry 50, the DPSK circuitry 52, and the RF circuitry 54 respectively define circuit card assemblies (CCAs). The interrogator uses an IEEE-1284 compatible port in EPP mode to communicate with the host computer 48. The EPP circuitry 50 provides all the digital logic required to coordinate sending and receiving a message with a transponder 16. The EPP circuitry 50 buffers data to transmit from the host computer 48, converts the data to serial data, and encodes it. The EPP circuitry 50 then waits for data from the transponder 16, converts it to parallel, and transfers it to the host computer 48. In one embodiment, messages include up to 64 bytes of data.

The EPP mode interface provides an asynchronous, interlocked, byte wide, bidirectional channel controlled by a host device. The EPP mode allows the host computer to transfer, at high speed, a data byte to/from the interrogator within a single host computer CPU I/O cycle (typically 0.5 microseconds per byte).

Figure 6:
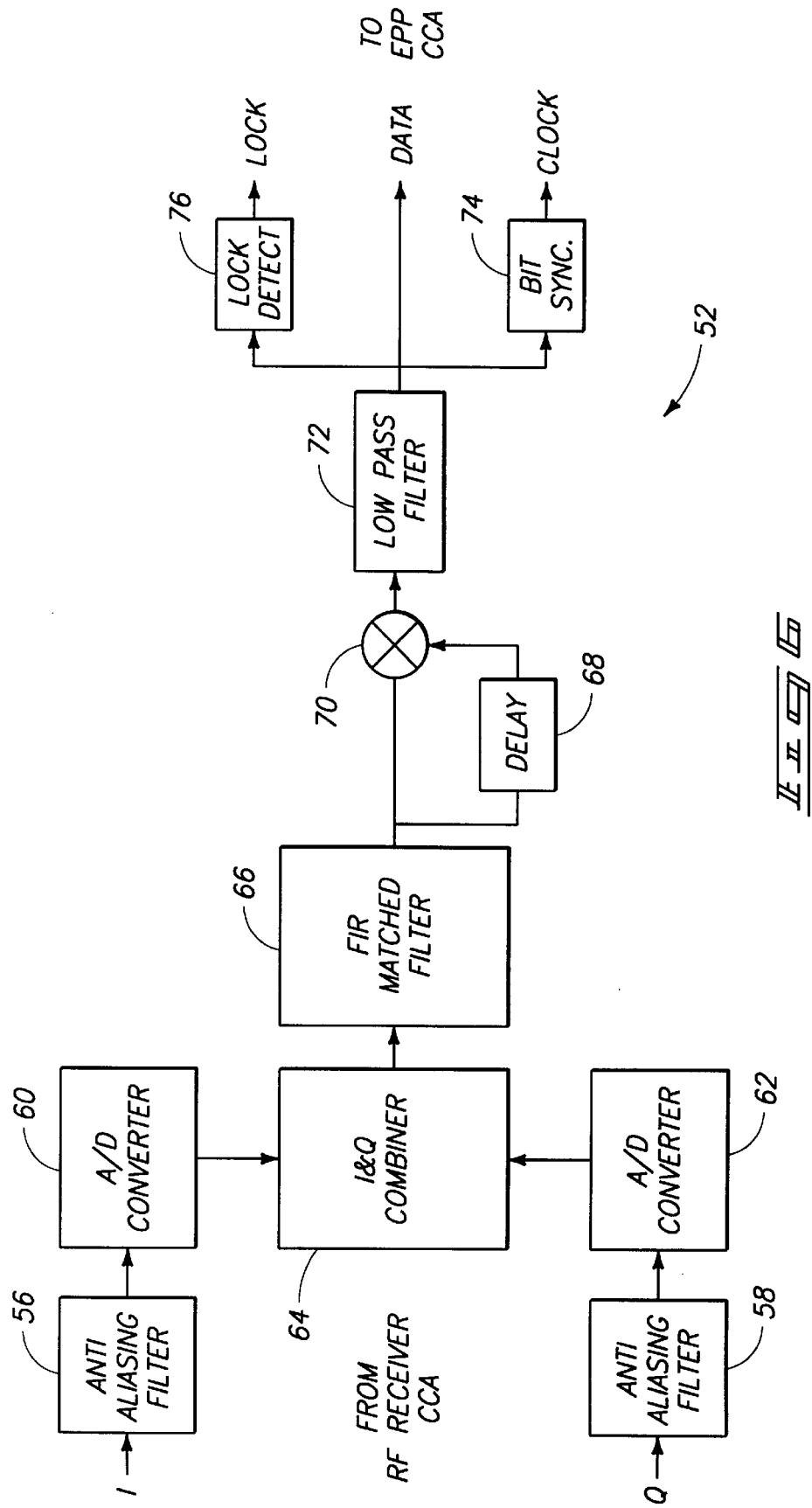
FIG. 6 is a circuit schematic of DPSK circuitry included in the interrogator of FIG. 5.

The DPSK circuitry 52 (see FIG. 6) receives signals I and Q from the RF circuitry 54 (described below), which signals contain the DPSK modulated sub-carrier. The DPSK circuitry 52 includes anti-aliasing, filters 56 and 58 filtering the I and Q signals, respectively, and analog to digital (A/D) converters 60 and 62 respectively coupled to the filters 56 and 58 and respectively converting the filtered signals from analog to digital signals. The DPSK circuitry 52 further includes a combiner 64, coupled to the A/D converters 60 and 62, combining the digital signals. The DPSK circuitry 52 further includes a FIR matched filter 66, coupled to the combiner 64, which filters the combined signals.

The DPSK circuitry 52 further includes delay circuitry 68 and multiplier circuitry 70 coupled to the FIR matched filter 66 for delaying the signal and multiplying the signal with the delayed signal to remove the sub-carrier. The DPSK circuitry 52 further includes low pass filter circuitry 72, coupled to the multiplier 70, filtering the output of the multiplier 70 to remove the X2 component. The DPSK circuitry 52 further includes a bit synchronizer 74 coupled to the filter 72 for regeneration of the data clock. The DPSK circuitry 52 further includes lock detect circuitry 76 coupled to the low pass filter 72 and generating a lock detect signal. The data, clock, and lock detect signal are sent to the EPP circuitry 50.

Figure 7:
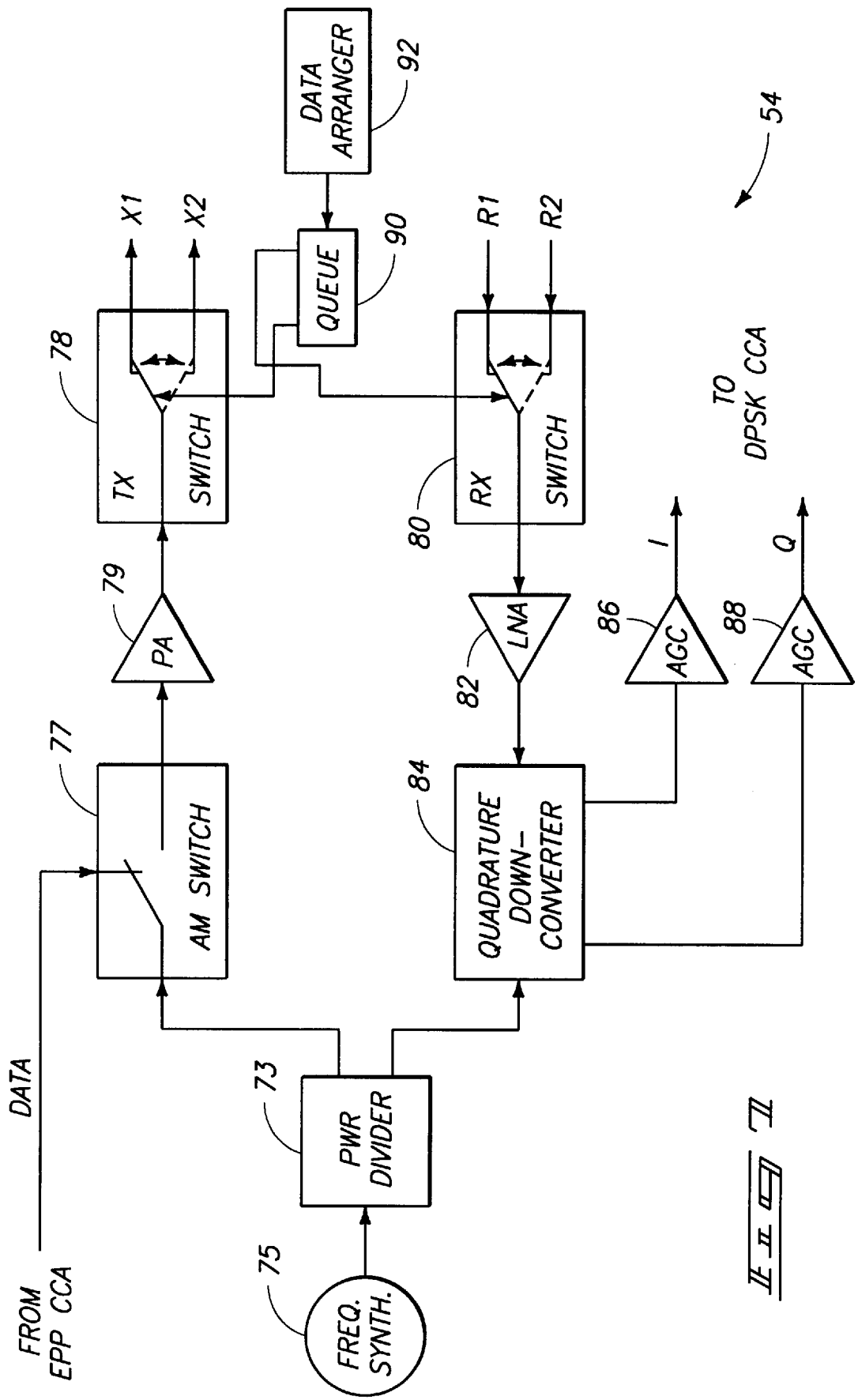
FIG. 7 is a circuit schematic of RF circuitry included in the interrogator of FIG. 5.

The RF circuitry 54 (see FIG. 7) interfaces with the transmit and receive antennas X1, X2, R1, and R2. The RF circuitry modulates the data for transmission to a transponder 16, provides a continuous wave (CW) carrier for backscatter communications with a transponder 16 (if backscatter communications are employed), and receives and downconverts the signal received from the transponder unit (which is a backscatter signal in one embodiment).

The RF circuitry 54 also includes a power divider 73, and a frequency synthesizer 75 coupled to the power divider 73. The frequency synthesizer 75 tunes the RF continuous waver carrier for frequency hopping and band selection. The RF circuitry defines a transmitter, and receives data from the EPP circuitry 50. The RF circuitry 54 includes an amplitude modulation (AM) switch 77 that receives the data from the EPP circuitry 50 and amplitude modulates the data onto a carrier. More particularly, the AM switch 77 turns the RF on and off (ON OFF KEY). The RF circuitry 54 further includes a power amplifier 79, coupled to the AM switch 77, which amplifies the signal. The RF circuitry 54 further includes a diversity switch 78, coupled to the power amplifier 76, for transmission of the amplified signal through a selected one of the two transmit antennas X1 and X2. In an alternative embodiment, the switch 78 is coupled to more than two antennas and provides for switching from among the multiple antennas.

During continuous wave (CW) transmission for the backscatter mode, the AM switch 74 is left in a closed position. When the interrogator 26 is transmitting in the CW mode, the transponder 16 backscatters the signal with a DPSK modulated sub carrier. This signal is received via one of the two diversity receive antennas R1 and R2. More particularly, the RF circuitry 54 further includes a diversity switch 80 coupled to the receive antennas R1 and R2. In an alternative embodiment, the switch 80 is coupled to more than two antennas and provides for switching from among the multiple antennas. In another alternative embodiment, such as when backscatter communications are not employed, the RF circuitry uses common antennas for both transmission and reception, and selects from multiple available send/receive antennas. The RF circuitry 54 further includes a low noise amplifier (LNA) 82 coupled to the switch 80 and amplifying the received signal. The RF circuitry 54 further includes a quadrature downconverter 84, coupled to the LNA 82, coherently downconverting the received signal. The RF circuitry 54 further includes automatic gain controls (AGCS) 86 and 88 coupled to the quadrature down converter 84. The amplitude of the signals are set using the automatic gain controls 86 and 88 to provide the signals I and Q. The I and Q signals, which contain the DPSK modulated sub-carrier, are passed on to the DPSK circuitry 52 for demodulation.

FIG. 8 illustrates a stack or queue 90 including locations holding data representing antennas X1, X2, R1, and R2. The stack or queue 90 defines an order in which antennas will be used to attempt communication. More particularly, in the illustrated embodiment, the stack 90 has a plurality of rows defining the locations. In the Is illustrated embodiment, the stack has two columns, one holding data representing a transmit antenna X1 or X2, and another column holding data representing a receive antenna R1 or R2, and the various rows represent various possible combinations of transmit and receive antennas that can be employed to attempt communications with a transponder 16. In other embodiments, there are more than two send antennas and or receive antennas, so there will be more rows.

In one embodiment, where backscatter transmission is not employed, antennas are used for both transmitting and receiving, and the stack includes only one column.

In the illustrated embodiment, the transmit antenna X2 is preferably spaced apart from the transmit antenna X1. Also, in the illustrated embodiment, the receive antenna R2 is preferably spaced apart from the receive antenna R1. For example, in one embodiment, the transmit antenna X1 is spaced apart from the transmit antenna X2 by a distance of one wavelength or more. Wavelength is calculated as the speed of light divided by the communications frequency; i.e., approx. $3.0 \times 10^8$ meters/second divided by 2.44 GHz. In a more particular embodiment, the transmit antenna X1 is spaced apart from the transmit antenna X2 by a distance of between one wavelength and ten wavelengths. In one embodiment, the receive antenna R1 is spaced apart from the receive antenna R2 by a distance of one wavelength or more. In a more particular embodiment, the receive antenna R1 is spaced apart from the receive antenna R2 by a distance of between one wavelength and ten wavelengths. In one embodiment, the transmit antenna X2 is oriented at an angle different from the angle of the transmit antenna X1. In one embodiment, the receive antenna R2 is oriented at an angle different from the angle of the receive antenna R1. In one embodiment, the transmit antenna X2 is positioned at a height different from the height of the transmit antenna X1. In one embodiment, the receive antenna R2 is positioned at a height different from the angle of the receive antenna R1.

When the interrogator attempts communication with a transponder 16, the interrogator will first attempt communications using the data at the top of the queue 90; i.e., in the embodiment shown in FIG. 8, the interrogator will first attempt to use an antenna pair represented by data in the first or top row of the stack 90 (e.g., using transmit antenna X1 and receive antenna R1 in the illustrated embodiment). If successful communication is not established, the interrogator 26 will attempt communication using the antenna pair represented by data in the second row of the stack 90 (e.g., using transmit antenna X1 and receive antenna receive antenna R2). If successful communication is still not established, the interrogator will attempt communication using the antenna pair represented by data in the third row of the stack 90 (e.g., using transmit antenna X2 and receive antenna receive antenna R1). If successful communication is not established, the interrogator will attempt communication using the antenna pair represented by data in the fourth row of the stack (e.g., using transmit antenna X2 and receive antenna receive antenna R2). If successful communication is still not established, the interrogator may again attempt communication using the antenna pair represented by data in the first row of the stack, or may terminate attempts at communication (either for a predetermined amount of time, or indefinitely). Any initial ordering of the stack can, of course, be employed. Preferably, all possible combinations of transmit and receive antennas will be included in the stack; however, in other embodiments, not all combinations of transmit and receive antennas will be included in the stack.

A problem with the method described in connection with FIG. 8 is that if one of the antennas (X1, for example) is blocked, broken, jammed, etc., the communication attempt may fail using multiple rows (e.g., the communication attempt will fail both Attempt 1 and Attempt 2 shown in FIG. 8 if X1 is blocked, etc.). Each attempt takes time. For example, in one embodiment, each attempt takes 2040 milliseconds. Thus, in the illustrated embodiment, attempt 1 and attempt 2 fail, so 40–80 milliseconds are lost, even though a command will eventually be successfully sent from the interrogator to the transponder 16.

If the last successful attempt were tried first for a subsequent command, the chances (or probability) of receiving a good reply would be much higher. Therefore, a "last-good-on-top" selection can be made, using the host computer 48, in which the data representing the antenna pair for the last successful attempt is moved to the top of the stack; e.g., by a data arranger 92 included in the first transponder. Therefore, for the example described above, if successful communication does not take place until the antenna pair X2, R1 is employed, data representing the antenna pair X2, R1 is moved to the top of the stack 90 and the other pairs are pushed down as illustrated in FIG. 9. Therefore, for the next command, the antenna pair X2, R1 will be employed for the first communication attempt. The data arranger re-orders the stack 90 as other hits occur (e.g., if the antenna pair represented by data in the top of the stack does not produce a successful communication but another antenna pair does produce a successful communication).

It is possible that more filtering would result in better ordering, particularly in a more dynamic scenario. For example, a failed communication may be due to a temporary condition (e.g., caused by a moving object proximate a transponder 16, caused by temporary interference, caused by temporary atmospheric conditions, etc.). Therefore, a "bubble-to-top" selection can be made, using the host computer 48, in which the data representing the antenna pair for the last successful attempt is moved up in the queue 90 by only one slot (or row, or location) by the data arranger 92. Therefore, for the example described above, if successful communication does not take place until the antenna pair X2, R1 is employed, data representing the antenna pair X2, R1 is swapped with data in the row above. Thus, data representing the antenna pair X2, R1 is moved up one row in the queue 90 and the data that was in that row is moved down one row. For the example described above, if successful communication does not take place until the antenna pair X2, R1 is employed, the resulting queue order will be that shown in FIG. 10. Therefore, for the next command, the antenna pair X1, R1 will be employed for the first communication attempt.

Using the host computer 48, the data arranger 92 is selectively instructed to employ "bubble-to-top" (e.g., FIG. 10) data rearrangement of the queue 90, to employ "last-good-on-top" (e.g., FIG. 9) data rearrangement of the queue 90, or to perform no rearrangement of the queue 90 (e.g., FIG. 8). This selection can be made, in one embodiment, using two data bits in a command sent from the host computer 48 to the interrogator 26.

In one embodiment, no attempt is made to provide a separate stack or queue 90 for each transponder 16; however, in an alternative embodiment, a separate stack or queue 90 is maintained for each transponder 16.

The following table summarizes specifications for an interrogator 26 in accordance with the illustrated embodiment of the invention. Other embodiments, having different specifications, can be employed.

Forward Link (Interrogator to transponder 16 (tag))

| Master Clock | | 19.075 MHz* |
|---|---|---|
| Data Rate | high | 307.66 kbps (effective 189.33 kbps) |
| | low | 153.83 kbps (effective 94.67 kbps) |
| Frequency | low | 2418 MHz |
| | mid | 2442 MHz |
| | high | 2465 MHz |
| Modulation | | OOK |
| Transmit Power | | 1 Watt (30 dBm) |
| DS Spread Spectrum | | 31 chips per bit |
| Chipping Rate | high | 9.5375 Mcps |
| | low | 4.76875 Mcps |
| Code length | | 31 |
| Error Correction | | 16-bit Check Sum |
| | | 5 bit parity |
| | | 1 bit correction |
| | | 2 bit detection |
| Demodulation Technique | | Diode Detector (Square Law Device) |

Return Link (transponder 16 (tag) to interrogator)

| Data Rate (instantaneous) | | 149 kbps |
|---|---|---|
| Frequency | low | 2418 MHz |
| | mid | 2442 MHz |
| | high | 2455 MHz |
| Modulation | | Backscatter with DPSK sub carrier |
| Sub Carrier frequency | | 596 kHz |
| Frequency Hopping | | 75 Freq. 400 kHz apart |
| Hopping Rate | | Once each message |
| Message Length | | 64 bytes + header |
| Receiver sensitivity | | −80 dBm |
| Sub carrier demodulation | | DPSK using DSP |
| Error Correction | | 16-bit Check Sum |
| | | 5 bit parity |
| | | 1 bit correction |
| | | 2 bit detection |
| Interleaving | | Each pair of data words |

*In one embodiment, interrogators use a master clock of 19.6608 MHz. The Data rate and chipping rates will change accordingly.

Protocol

Examples of commands that can be sent from the interrogator 26 to the device 12 are as follows:

Identify

An Identify function is used when attempting to determine the identification of one or more of the devices 12. Each device 12 has its own identification number "TagId." It is possible that the interrogator will receive a garbled reply if more than one tag responds with a reply. If replies from multiple tags are received, an arbitration scheme is used to isolate a single device 12.

ReadAnalogPort

In one embodiment, a ReadAnalogPort function is provided which returns the voltage (eight-bit value) of a selected analog port on a device 12.

ReadDigitalPort

A ReadDigitalPort function returns data read from a serial port of a device 12.

ReadTagMemory

A ReadTagMemory function returns data from a user accessible portion of memory included in a device 12.

ReadTagStatus

A ReadTagStatus function returns system information about a specified device 12. For example, in response to this command, the device 12 will transmit a confirmation of its TagId, a tag revision number, the low battery status bit, and other information.

SetAlarmMode

In one embodiment, a SetAlarmMode function is provided which is used to determine if a set point has been exceeded on an analog port of the device 12 (e.g., if a sensor senses a condition exceeding a predetermined threshold). There are three alarm modes: SET_HIGH_BAND_ON_ ALARM, SET_LOW_BAND_ON_ALARM, and SET_ STATUS_REG_ON_ALARM. The SET_HIGH_ BAND_ON_ALARM mode sets a device 12 to a low data band, and clears a bit in the device's status register indicative of an alarm threshold being exceeded. When a set point (threshold) is violated, the device 12 will switch from the low data band to a high data band. The SET_LOW_ BAND_ON_ALARM mode sets a device 12 to a high data band, and clears a bit in the device's status register indicative of an alarm threshold being exceeded. When a set point (threshold) is violated, the device 12 will switch from the high data band to the low data band.

The SET_STATUS_REG_ON_ALARM mode does not change data bands, but will result in a bit ALARM_ THRESHOLD_EXCEEDED in the status register being set if the set point is violated.

SetMemoryPartition

A SetMemoryPartition function defines (initializes) a block of user memory in a device 12 for memory partition. After being initialized, a partition may be used to store data using a function WriteTagMemory. Data may be read from the partition using a function ReadTagMemory. The number of partitions available on a device 12 can be determined using the ReadTagStatus function.

WriteAccessId

A WriteAccessId function is used to update an access identification AccessId for one of the memory partitions.

WriteDigitalPort

A WriteDigitalPort function is used to write data to the synchronous serial port of a device 12.

WriteTagId

A WriteTagId function is used to update the TagId of a device 12.

WriteTagMemory

A WriteTagMemory function is used to write to the user memory space UserMemory of a device 12.

WriteTagsRegs

A WriteTagsRegs function is used to update selected or all registers of a device 12 including registers TagControlReg, LswTagId, TagStoredinterrId, TimedLockoutCounter, and DormantCounter for a range of RandomValueIds. This command can be used, for example, to disable a device 12. If desired, the transmitter of a device 12 can be disabled while the receiver of that device 12 is left functional. This is accomplished using bits KILL_TAG_0 and KILL_ TAG_1 in a register TagControlReg.

WriteTagRegsRandIdRange and WriteTagRegsTag-IdRange

WriteTagRegsRandIdRange and WriteTagRegsTag-IdRange functions are used to update registers of a group of devices 12. The WriteTagRegsTagIdRange function updates selected or all registers, including registers TagControlReg, LswTagId, TagStoredInterrid, TimedLockoutCounter, and DormantCounter, for a range of TagIds.

Examples of interrogator commands are as follows:

GetCrntAntenna

A GetCrntAntenna function returns the current antenna set used s to communicate with a device 12.

GetCrntRetries

A GetCrntRetries function returns the number of times a command was re-transmitted during the last tag-specific command.

GetInterrStats

A GetInterrStats function returns record-keeping parameters if the interrogator performs this function.

GetReplyStats

A GetReplyStats function returns values that are specific to the last tag-specific reply if the interrogator processes this information.

SetInterrRegs

A SetInterrRegs function is used to set various communication parameters on an interrogator. Not all of the parameters are used on all interrogators.

SetInterrTest

A SetInterrTest function is used during testing. This function should not be called in normal operation.

SetTimeouts

A SetTimeouts function is used to set system watchdog timers.

A convenience command is described as follows:

IdentifyAll

An IdentifyAll function returns the number of devices 12 found within the system's communication range. The IdentifyAll reply parameters include the TagId and RandomValueId for each device 12 that is identified.

Details of Arbitration

The arbitration of multiple interrogators per device 12 is a detection method based upon each interrogator using a unique interrogator ID (InterrId). The InterrId is sent to a device 12 in a command. The device 12 also stores an interrogator ID TagStoredInterrId. The TagStoredInterrId is only updated by a WriteTagRegsXXX command. A RcvdInterrId is included in replies from a device 12. If a TagStoredInterrId does not match the RcvdInterrId then the tag will not respond with a reply.

The arbitration of more than one tag per interrogator 26 is accomplished by using an ArbitrationValue and an ArbitrationMask during an Identify command. Contained within each device 12 is a random value ID (RandomValueId) and an arbitration lockout (IDENTIFY-LOCKOUT) bit. The RandomValueId is set to a "random" binary number upon command by an interrogator. It may also be set by an Identify command setting a SELECT_RANDOM_VALUE bit in SubCmnd.

The following examples use a 1-byte ArbitrationValue for simplicity. If an interrogator 26 transmits an Identify command with its ArbitrationMask set to 0000 0000 (binary), all devices 12 in the receiving range will respond. If there is only one device 12, communications may proceed between the interrogator 26 and device 12. If there are multiple devices 12 responding, the interrogator 26 will detect a collision and will start the arbitration sequence. To start the arbitration sequence among multiple tags, the interrogator 26 instructs the tags to clear their IDENTIFY LOCKOUT bit and (possibly) re-randomize their RandomValueId values. The ArbitrationValue 0000 0000 and ArbitrationMask 0000 0001 are then transmitted to all devices 12 in range. The devices 12 perform a logical ANDing (masking) of the ArbitrationMask and the RandomValueId. If the result matches the ArbitrationValue sent by the interrogator 26, the device or devices 12 will reply to the Identify command. If not, the interrogator 26 will increment the ArbitrationValue to 0000 0001 and try again.

The interrogator 26 then checks each of the possible binary numbers (0000 0000 and 0000 0001 in this case) in the expanded mask (0000 0001) for a response by a device 12. If a single device 12 responds to one of these values, the interrogator 26 will reply by commanding it to set its lockout bit. If any collisions are detected at this mask level, the mask would be widened again by one bit, and so on through the eight bit wide mask (256 numbers). If no collisions are detected for a particular ArbitrationValue and Arbitration- Mask combination, the TagId returned in the reply is used for direct communication with that particular device 12. During the arbitration sequence with up to about one hundred devices 12, the mask will eventually grow large enough such that all devices 12 can respond without collision. After the mask widens to four or five bits, more devices 12 have unique random numbers and single tag replies are received. Thus with each expansion of the ArbitrationMask, there are fewer and fewer tags left to Identify.

With a large number of tags in range, it is possible that several devices 12 will choose the same value for their RandomValueId. In this case, the complete mask will be used. Collisions will still occur and the remaining tags will be instructed to select a new Random ValueId. If an application dictates, for example, that one hundred tags will usually be present in range of the interrogator 26, it would be advantageous to start with the mask set to eight bit wide (11111111) and count up through 256 instead of starting with the mask set at 0000 0000, followed by 0000 0001, 0000 0011, etc. Other arbitration schemes, can be implemented by the user.

In compliance with the statute, the invention has been described in language more or less specific as to structural and methodical features. It is to be understood, however, that the invention is not limited to the specific features shown and described, since the means, herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A wireless communications system comprising:
   a first transponder adapted to be coupled to one of a plurality of selectable antennas, and having a stack including locations holding data representing a plurality of antennas, the stack defining an order in which antennas will be used to attempt communication; and
   a second transponder configured to communicate with the first transponder, wherein the first transponder uses an antenna defined by data in one location of the stack for communication with the second transponder, and, if successful communication with the second transponder is not established, the first transponder uses different antennas in successive communications attempts, in the defined order, and wherein the first transponder rearranges the stack after a successful communication if the successful communication did not occur using the antenna defined by data in the first mentioned location of the stack.

2. A wireless communications system in accordance with claim 1 wherein the first transponder communicates with the second transponder using backscatter communications.

3. A wireless communications system in accordance with claim 1 wherein the first transponder communicates with the second transponder using backscatter communications, wherein the first transponder employs separate receive and transmit antennas, and wherein the respective locations of the stack store data representing antenna pairs including one transmit antenna and one receive antenna.

4. A wireless communications system in accordance with claim 1 wherein the second transponder comprises an integrated circuit including a transmitter, a receiver, and a microprocessor.

5. A wireless communications system in accordance with claim 1 wherein the second transponder comprises a radio frequency identification device including memory storing data identifying the second transponder.

6. A wireless communications system in accordance with claim 1 wherein the first transponder rearranges the stack if successful communication is not established using the antenna defined by data in the first mentioned location of the stack such that data representing an antenna using which successful communications is established is moved to the first mentioned location of the stack.

7. A wireless communications system in accordance with claim 1 wherein the first transponder rearranges the stack if successful communication is not established using the antenna defined by data in the first mentioned location of the stack such that data representing an antenna using which successful communications is established is moved closer to the first mentioned location of the stack.

8. A wireless communications system in accordance with claim 1 and further comprising a plurality of transmit antennas, and wherein one of the transmit antennas is spaced apart from another of the transmit antennas by at least one wavelength.

9. A wireless communications system in accordance with claim 8 and further comprising a plurality of receive antennas, and wherein one of the receive antennas is spaced apart from another of the receive antennas by at least one wavelength.

10. A radio frequency communications system comprising:
    a first radio frequency transponder adapted to be coupled to one of a plurality of selectable antennas, and including a stack having rows holding data representing antennas, including a first row, a second row, and a last row, and rows between the second and last rows, the stack defining an order, from the first row to the last row, in which antennas will be used to attempt communication;
    a second radio frequency transponder configured to communicate with the first transponder, wherein the first transponder uses an antenna defined by data in the first row of the stack for communication with the ii second transponder, and, if successful communication with the second transponder is not established, the transponder uses an antenna defined by data in the second row of the stack, and, if successful communication with the second transponder is not established, the transponder uses an antenna defined by data in the next row of the stack, and so on until successful communication with the second transponder is established; and
    a data arranger selectively rearranging the order of the data in the stack, and operable in a first mode, wherein data representing the first antenna that resulted in successful communication is moved to the first row of the stack, and a second mode, wherein data representing the first antenna that resulted in successful communication is swapped with data in the row adjacent to the row holding the data representing the first antenna that resulted in successful communication and closer to the first row than the last row.

11. A radio frequency communications system in accordance with claim 10 wherein the data arranger is further operable in a third mode wherein data is the stack is not rearranged regardless of which antenna selection results in successful communication with the second transponder.

12. A radio frequency communications system in accordance with claim 10 wherein the first transponder communicates with the second transponder using backscatter communications and, after the first transponder sends data to the second transponder, the first transponder transmits a continuous wave to the second transponder, wherein the communication system includes a dipole antenna coupled to the second transponder, the dipole antenna having two halves, and wherein the second transponder selectively reflects and does not reflect the continuous wave by either shorting or not shorting the two halves of the dipole antenna.

13. A radio frequency communications system in accordance with claim 10 wherein the first transponder communicates with the second transponder using backscatter communications, wherein the first transponder employs separate receive and transmit antennas, and wherein the respective rows of the stack store data representing antenna pairs respectively defined by one transmit antenna and one receive antenna.

14. A radio frequency communications system in accordance with claim 10 wherein the second transponder comprises a radio frequency identification device including memory storing data identifying the second transponder.

15. A radio frequency communications system wireless communications system in accordance with claim 10 and further comprising a plurality of transmit antennas, wherein the first transponder includes a switch for selecting which of the transmit antennas will be employed for wireless transmission by the first transponder, and wherein one of the transmit antennas is spaced apart from another of the transmit antennas by at least one wavelength.

16. A radio frequency communications method comprising:
    defining a queue having rows holding data representing antennas, including a top row and a bottom row, the queue defining an order, from the top of the queue to the bottom of the queue, in which antennas will be used to attempt communication;
    causing a first transponder to use an antenna defined by data in the top row of the queue for communication with a second transponder, and, if successful communication with the second transponder is not established, causing the first transponder to use an antenna defined by data in the next highest row of the queue, and, if successful communication with the second transponder is not established, causing the first transponder to use an antenna defined in the next highest row of the queue and so on until successful communication with the second transponder is established; and
    rearranging the order of the data in the queue in accordance with a selected one of a first mode, wherein data representing the first antenna that resulted in successful communication is moved to the top of the queue, and a second mode, wherein data representing the first antenna that resulted in successful communication is swapped with data in the row above the row holding the data representing the first antenna that resulted in successful communication.

17. A radio frequency communications method in accordance with claim 16 wherein the rearranging step further includes a selectable third mode, wherein data is the queue is not rearranged regardless of which antenna selection results in successful communication with the second transponder.

18. A radio frequency communications method in accordance with claim 16 and further comprising the step of causing the first transponder to communicate with the second transponder using backscatter communications and, after the first transponder sends data to the second transponder, causing the first transponder to transmit a continuous wave to the second transponder, and causing the second transponder to communicate with the first transponder by selectively reflecting and not reflecting the continuous wave by either shorting or not shorting two halves of a dipole antenna.

19. A radio frequency communications method in accordance with claim 16 and further comprising causing the first transponder to communicate with the second transponder using backscatter communications, and coupling the first transponder to separate receive and transmit antennas, and storing data in the respective rows of queue representing antenna pairs respectively including one transmit antenna and one receive antenna.

20. A radio frequency communications method in accordance with claim 16 and further comprising the step of storing identifying data in the second transponder, and causing the second transponder to communicate the identifying data to the first transponder in response to a command from the first transponder.

21. A backscatter radio frequency communications system comprising:
    a plurality of transmit antennas and receive antennas;
    a first radio frequency transponder selectively coupled to an antenna pair defined by one of the transmit antennas and one of the receive antennas, and including a stack having rows holding data representing antenna pairs, including a top row and a bottom row, the stack defining an order, from the top of the stack to the bottom of the is stack, in which antennas will be used by the first transponder to attempt communication;
    a second radio frequency transponder configured to communicate with the first transponder, wherein the first transponder uses an antenna pair defined by data in the top row of the stack for communication with the second transponder, and, if successful communication with the second transponder is not established, the transponder uses an antenna pair defined by data in the next highest row of the stack, and, if successful communication with the second transponder is still not established, the transponder uses an antenna pair defined by data in the next highest row of the stack, and so on until successful communication with the second transponder is established, the first transponder being configured to communicate with the second transponder using backscatter communications wherein, after the first transponder sends data to the second transponder, the first transponder transmits a continuous wave to the second transponder;
    a dipole antenna coupled to the second transponder, the dipole antenna having two halves, the second transponder being configured to reflect and not reflect the continuous wave by either shorting or not shorting the two halves of the dipole antenna to communicate with the first transponder; and
    a data arranger configured to rearrange the order of the data in the stack, and operable in a first mode, wherein data representing the first antenna pair that resulted in successful communication is moved to the top of the stack, a second mode, wherein data representing the first antenna pair that resulted in successful communication is swapped with data in the row above the row holding the data representing the first antenna that resulted in successful communication, and a third mode wherein data is the stack is not rearranged regardless of which antenna selection results in successful communication with the second transponder.

22. A wireless communications system for use with an array of spaced apart antennas, the system comprising:
    a first transponder configured to be coupled to one of the antennas, and having an array including locations representing respective antennas, the array defining an order in which antennas will be used to attempt communication; and a second transponder configured to communicate with the first transponder, wherein the first transponder uses an antenna defined by one location of the array for communication with the second transponder, and, if successful communication with the second transponder is not established, the first transponder uses different antennas in successive communications attempts, in the defined order, and wherein the first transponder rearranges the order after a succesful communication if the successful communication did not occur using the antenna defined by the one location of the array.

23. A wireless communications system in accordance with claim 22 wherein the first transponder communicates with the second transponder using backscatter communications.

24. A wireless communications system in accordance with claim 22 wherein the first transponder communicates with the second transponder using backscatter communications, wherein the first transponder employs separate receive and transmit antennas, and wherein the respective locations of the array store data representing antenna pairs including one transmit antenna and one receive antenna.

25. A wireless communications system in accordance with claim 22 wherein the second transponder comprises an integrated circuit including a transmitter, a receiver, and a microprocessor.

26. A wireless communications system in accordance with claim 22 wherein the second transponder comprises a radio frequency identification device including memory storing data identifying the second transponder.

27. A wireless communications system in accordance with claim 22 wherein the first transponder rearranges the order if successful communication is not established using the antenna defined by the one location of the array such that an antenna using which successful communications is established is used first in a subsequent communication attempt.

28. A wireless communications system in accordance with claim 22 wherein the first transponder rearranges the order if successful communication is not established using the antenna defined by the one location of the array such that an antenna using which successful communications is established is used sooner in a subsequent communication attempt.

29. A wireless communications system in accordance with claim 22 and further comprising a plurality of transmit antennas, and wherein one of the transmit antennas is spaced apart from another of the transmit antennas by at least one wavelength.

30. A wireless communications system in accordance with claim 29 and further comprising a plurality of receive antennas, and wherein one of the receive antennas is spaced apart from another of the receive antennas by at least one wavelength.

31. A radio frequency communications system comprising:

a first radio frequency transponder adapted to be coupled to one of a plurality of selectable antennas, and including an array having rows holding data representing antennas, including a first row, a second row, and a last row, and rows between the second and last rows, the array defining an order, from the first to the last row, in which antennas will be used to attempt communication;

a second radio frequency transponder configured to communicate with the first transponder, wherein the first transponder uses an antenna defined by data in the first row of the array for communication with the second transponder, and, if successful communication with the second transponder is not established, the transponder uses an antenna defined by data in the second row of the array, and, if successful communication with the second transponder is not established, the transponder uses an antenna defined by data in the next row of the array, and so on until successful communication with the second transponder is established; and a data arranger selectively rearranging the order of the data in the array, and operable in the first mode, wherein data representing the first antenna that resulted in successful communication is moved to the first row of the array, and a second mode, wherein data representing the first antenna that resulted in successful communication is swapped with data in the row that is adjacent to the row holding the data representing the first antenna that resulted in successful communication and that is closer to the first row than the last row.

32. A radio frequency communications system in accordance with claim 31 wherein the data arranger is further operable in a third mode wherein data is the array is now rearranged regardless of which antenna selection results in successful communication with the second transponder.

33. A radio frequency communications system in accordance with claim 31 wherein the first transponder communicates with the second transponder using backscatter communications and, after the first transponder sends data to the second transponder, the first transponder transmits a continuous wave to the second transponder, wherein the communication system includes a dipole antenna coupled to the second transponder selectively antenna having two halves, and wherein the second transponder selectively reflects and does not reflect the continuous wave by either shorting or not shorting the two havles of the dipole antenna.

34. A radio frequency communications system in accordance with claim 31 wherein the first transponder communicates with the second transponder using backscatter communications, wherein the first transponder employs separate receive and transmit antennas, and wherein the respective rows of the array are configured to store data representing antenna pairs respectively defined by one transmit antenna and one receive antenna.

35. A radio frequency communications system in accordance with claim 31 wherein the second transponder comprises a radio frequency identification device including memory configured to store data identifying the second transponder.

36. A radio frequency communications system wireless communications system in accordance with claim 31 and further comprising a plurality of transmit antennas, wherein the first transponder includes a switch for selecting which of the transmit antennas will be employed for wireless transmission by the first transponder, and wherein one of the transmit antennas is spaced apart from another of the transmit antennas by at least one wavelength.

37. A communications method comprising steps to:

define a queue having rows configured to hold data representing antennas, including a top row and a bottom row, the queue defining an order, from the top of the queue to the bottom of the queue, in which antennas will be used to attempt communication;

cause a first transponder to use an antenna defined by data in the top row of the queue for communication with a second transponder, and, if successful communication with the second transponder is not established, cause the first transponder to use an antenna defined by data in the next highest row of the queue, and, if successful communication with the second transponder is not established, cause the first transponder to use an antenna defined in the next highest row of the queue and so on until successful communication with the second transponder is established; and rearrange the order of the data in the queue such that data representing the first antenna that resulted in successful communication is swapped with data in the row above the row holding the data representing the first antenna that resulted in successful communication.

38. A communications method in accordance with claim 37 wherein the step to rearrange further includes a selectable mode, wherein data is the queue is not rearranged regardless of which antenna selection results in successful communicaton with the second transponder.

39. A communications method in accordance with claim 37 and further comprising a step to cause the first transponder to communicate with the second transponder using backscatter communications and, after the first transponder sends data to the second transponder, cause the first transponder to transmit a continuous wave to the second transponder, and cause the second transponder to communicate with the first transponder by selectively reflecting and not reflecting the continuous wave by either shorting or not shorting two halves of a dipole antenna.

40. A communications method in accordance with claim 37 and further comprising steps to cause the first transponder to communicate with the second transponder using backscatter communications, and to couple the first transponder to separate receive and transmit antennas, and store data in the respective rows of queue representing antenna pairs respectively including one transmit antenna and one receive antenna.

41. A communications method in accordance with claim 37 and further comprising a step to store identifying data in the second transponder, and cause the second transponder to communicate the identifying data to the first transponder in response to a command from the first transponder.

42. A backscatter radio frequency communications system comprising:

a plurality of transmit antennas and receive antennas;

a first radio frequency transponder selectively coupled to an antenna pair defined by one of the transmit antennas and one of the receive antennas, and including an array having rows holding data representing antenna pairs, including a top row and a bottom row, the array defining an order, from the top of the array to the bottom of the array, in which antennas will be used by the first transponder to attempt communication;

a second radio frequency transponder configured to communicate with the first transponder, wherein the first transponder is configured to use an antenna pair defined by data in the top row of the array for communication with the second transponder, and, if successful communication with the second transponder is not established, the first transponder is configured to use an antenna pair defined by data in the next highest row of the array, and, if successful communication with the second transponder is still not established, the first transponder is configured to use an antenna pair defined by data in the next highest row of the array, and so on until successful communication with the second transponder is established, the first transponder being configured to communicate with the second transponder using backscatter communications wherein, the first transponder is configured to transmit a continuous wave to the second transponder after the first transponder sends data to the second transponder;

a dipole antenna coupled to the second transponder, the dipole antenna having two halves, the second transponder being configured to reflect and not reflect the continuous wave by either shorting or not shorting the two havles of the dipole antenna to communicate with the first transponder; and a data arranger configured to rearrange the order of the data in the array, and operable in a first mode, wherein data representing the first antenna pair that resulted in successful communication is moved to the top of the array, and a second mode, wherein data representing the first antenna pair that resulted in successful communication is swapped with data in the row above the row holding the data representing the first antenna that resulted in successful communication.

43. A backscatter radio frequency communications system in accordance with claim 42 wherein the data arranger is further operable in a third mode wherein data is the array is not rearranged regardless of which antenna selection results in successful communication with the second transponder.

* * * * *

UNITED STATES PATENT AND TRADEMARK OFFICE
CERTIFICATE OF CORRECTION

PATENT NO.   : 6,023,610
DATED        : February 8, 2000
INVENTOR(S)  : Clifton W. Wood, Jr.

It is certified that error appears in the above-identified patent and that said Letters Patent is hereby corrected as shown below:

Column 3, line 20, delete "so".
Column 4, line 5, replace "at least one s receive" with --at least one receive--.
Column 4, line 20, replace "of a card comprising" with --of a card 11 comprising--.
Column 6, line 51, replace "integrated circuit and" with --integrated circuit 16 and--.
Column 12, line 12, replace "P3=[(D3+D4" with --P3=[(D0+D4--
Column 13, line 56, replace "(AGCS)" with --(AGCs)--.
Column 13, line 67, replace "In the Is illustrated" with --In the illustrated--.
Column 15, line 5, replace "2040" with --20-40--.
Column 20, line 38, replace "with the ii second" with --with the second--.
Column 22, line 26, replace "bottom of the is stack," with --bottom of the stack,--.
Column 24, line 22, replace "now" with --not--.
Column 24, line 32, replace "selectively" with --, the dipole--.
Column 24, line 35, replace "havles" with --halves--.

Signed and Sealed this

Sixth Day of February, 2001

Attest:

Q. TODD DICKINSON

*Attesting Officer*            *Director of Patents and Trademarks*